US009667785B2

(12) United States Patent
Kumar et al.

(10) Patent No.: US 9,667,785 B2
(45) Date of Patent: May 30, 2017

(54) SYSTEM AND METHOD FOR PRESERVING CALL LANGUAGE SETTINGS FOR SESSION INITIATION PROTOCOL DIVERTED CALLS

(71) Applicant: Avaya Inc., Santa Clara, CA (US)

(72) Inventors: Puneet Kumar, Pune (IN); Manish Chatterjee, Calcutta (IN)

(73) Assignee: Avaya Inc., Santa Clara, CA (US)

( * ) Notice: Subject to any disclaimer, the term of this patent is extended or adjusted under 35 U.S.C. 154(b) by 80 days.

(21) Appl. No.: 14/721,329

(22) Filed: May 26, 2015

(65) Prior Publication Data
US 2016/0352897 A1    Dec. 1, 2016

(51) Int. Cl.
  *H04M 1/64* (2006.01)
  *H04M 3/493* (2006.01)
  *H04L 29/06* (2006.01)
  *H04M 7/12* (2006.01)
  *H04W 80/10* (2009.01)

(52) U.S. Cl.
  CPC ........ *H04M 3/493* (2013.01); *H04L 65/1006* (2013.01); *H04M 7/127* (2013.01); *H04W 80/10* (2013.01)

(58) Field of Classification Search
  CPC .................................................. H04M 3/5116
  See application file for complete search history.

(56) References Cited

U.S. PATENT DOCUMENTS

| | | | | |
|---|---|---|---|---|
| 7,076,051 B2* | 7/2006 | Brown | ................... | H04M 3/523 379/265.09 |
| 7,089,027 B1* | 8/2006 | Welch | ..................... | H04L 29/06 455/401 |
| 7,408,890 B1* | 8/2008 | Doran | ................. | H04L 12/1822 370/261 |
| 7,636,327 B1* | 12/2009 | Doran | ....................... | H04L 5/14 370/260 |
| 7,636,750 B2* | 12/2009 | Haldar | .................... | H04M 3/56 709/204 |
| 7,724,887 B2* | 5/2010 | Jennings | ........... | H04L 29/06027 379/210.01 |
| 7,769,809 B2* | 8/2010 | Samdadiya | ......... | H04L 65/1069 370/352 |
| 7,912,070 B1* | 3/2011 | Choksi | ................ | H04L 65/1089 370/277 |
| 7,979,519 B2* | 7/2011 | Shigeta | ............... | H04L 67/2823 370/349 |

(Continued)

*Primary Examiner* — Joseph T Phan
(74) *Attorney, Agent, or Firm* — Sheridan Ross P.C.

(57) ABSTRACT

A user is presented with a list of languages sent by an interactive response system in a Session Initiation Protocol (SIP) communication session. For example, the user is presented with a list of languages supported by an Interactive Voice Response system. The interactive response system receives a selection of a language from the list of languages supported by the interactive response system from the user. The SIP communication session with the user is sent (e.g., forwarded) to another communication device by sending a first SIP message, such as a SIP INVITE message. The first SIP message includes a SIP History-Info header that identifies the selected language for the first SIP communication session. The selected language can then be used to forego presenting a list of languages to the user later on during the SIP communication session.

20 Claims, 3 Drawing Sheets

(56) References Cited

U.S. PATENT DOCUMENTS

| | | | | |
|---|---|---|---|---|
| 8,700,783 B2* | 4/2014 | Sueda | .................. | H04M 7/003 |
| | | | | 709/227 |
| 2002/0147818 A1* | 10/2002 | Wengrovitz | ...... | H04L 29/06027 |
| | | | | 709/228 |
| 2007/0147599 A1* | 6/2007 | Sharpe | ................ | H04M 3/5166 |
| | | | | 379/265.02 |
| 2008/0123839 A1* | 5/2008 | McCormack | ......... | H04M 3/523 |
| | | | | 379/265.02 |
| 2010/0296634 A1* | 11/2010 | Schulzrinne | ......... | H04M 3/5116 |
| | | | | 379/45 |

* cited by examiner

SYSTEM AND METHOD FOR PRESERVING CALL LANGUAGE SETTINGS FOR SESSION INITIATION PROTOCOL DIVERTED CALLS

TECHNICAL FIELD

The systems and methods disclosed herein relate to communication systems and in particular to language handling in communication systems.

BACKGROUND

When a caller selects a language for a communication session, the language information is typically not conveyed during the rest of the communication session. For example, if a caller selects a language when initially connected to an Interactive Voice Response (IVR) system, if the caller is transferred back to the same IVR system or to another IVR system, the user will have to select the language again. This can be frustrating to a caller.

The Session Initiation Protocol (SIP) RFC 3261 defines an "Accept-Language" header. The Accept-Language header allows a client to indicate to a server a preferred language in which the user wants to display strings. However, this particular header does not address calls that are transferred or forwarded between different users and IVR systems.

SUMMARY

Systems and methods are provided to solve these and other problems and disadvantages of the prior art. A user is presented with a list of languages sent by an interactive response system in a Session Initiation Protocol (SIP) communication session. For example, the user is presented with a list of languages supported by an Interactive Voice Response system. The interactive response system receives a selection of a language from the list of languages supported by the interactive response system from the user. The SIP communication session with the user is sent (e.g., forwarded) to another communication device by sending a first SIP message, such as a SIP INVITE message. The first SIP message includes a SIP History-Info header that identifies the selected language for the first SIP communication session. The selected language can then be used to forego presenting a list of languages to the user later on during the SIP communication session.

DETAILED DESCRIPTION

Figure 1:
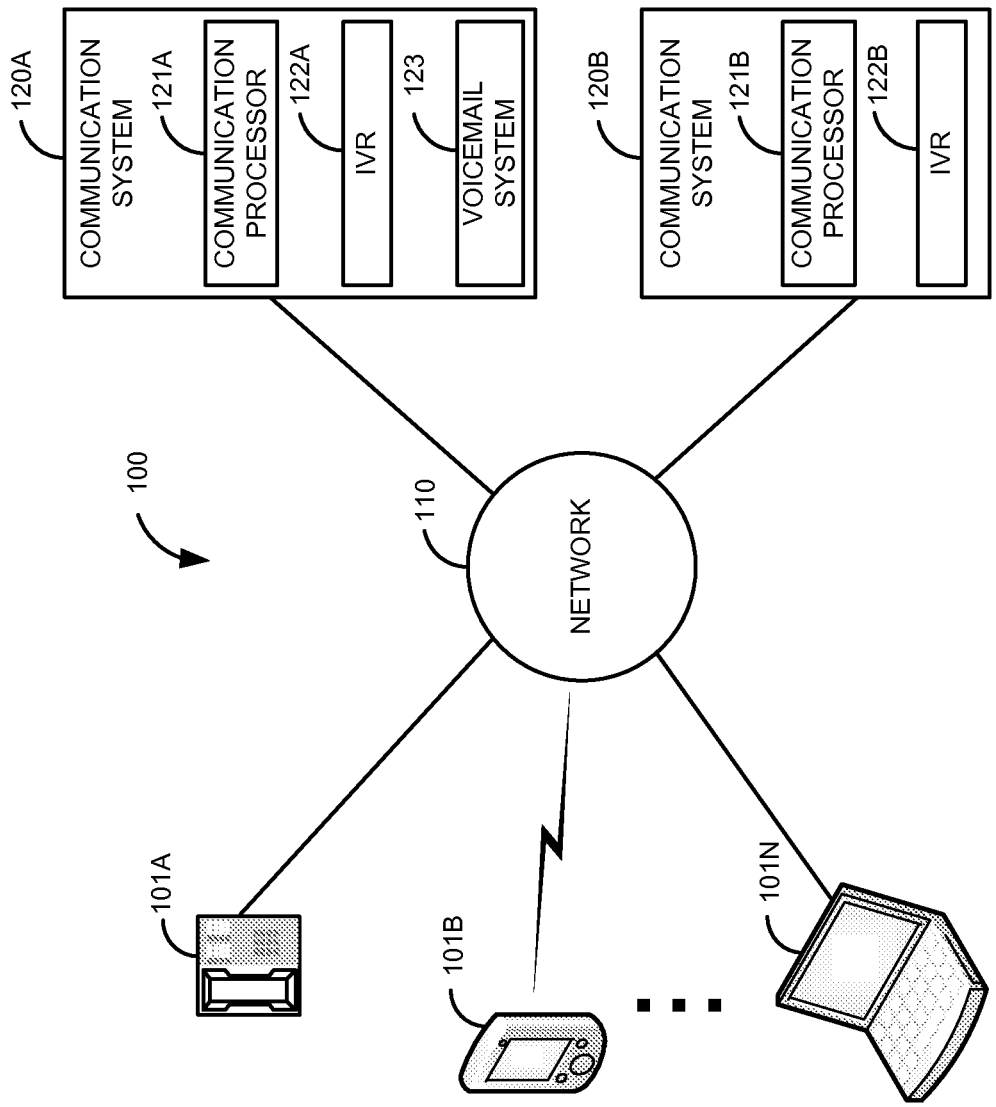
FIG. 1 is a block diagram of a first illustrative system for preserving language settings.

FIG. 1 is a block diagram of a first illustrative system 100 for preserving language settings. The first illustrative system 100 comprises communication devices 101A-101N, a network 110, and communication systems 120A and 120B.

The communication device 101 can be or may include any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to network 110, including only a single communication device 101. In addition, the communication device 101 may be directly connected to the communication system 120 or connected via a different network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a fiber optic network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry electronic messages via packets and/or circuit switched communications.

The communication system 120 can be or may include any communication hardware/software that can route communications, such as a Private Branch Exchange (PBX), a central office switch, a communication manager, a router, a proxy server, a communication server, and/or the like. The communication system 120A comprises a communication processor 121A, an IVR system 122A, and a voicemail system 123. The communication system 120B comprises a communication processor 121B and an IVR system 122B. The communication systems 120A and 120B are shown comprising different elements to illustrate one of many possible embodiments that may be used with the disclosed invention. In addition, although only two communication systems 120 are shown in FIG. 1, the first illustrative system 100 may include any number of communication systems 120, including only a single communication system 120.

The communication processor 121 can be or may include any processor that can route communications, such as a microprocessor, a digital signaling processor, an application specific processor, and/or the like. The communication processor 121 may be coupled with an operating system to provide routing services.

The IVR system 122 can be or may include any hardware/software that can interact with a person, such as, a contact center IVR system, an auto attendant, a company directory service, a voicemail system 123, and/or the like. The IVR system 122 is one type of interactive response system. For example, an interactive response system may interact with a person on an Instant Messaging, video, or text communication session. Although only two IVR systems 122A-122B are shown in FIG. 1, any of number of IVR systems 122 may be included in a communication system 120.

The voicemail system 123 can be or may include any hardware/software that can provide voicemail services. The voicemail system 123 comprises an IVR system 122 that can be used to review the user's voicemails.

Figure 2:
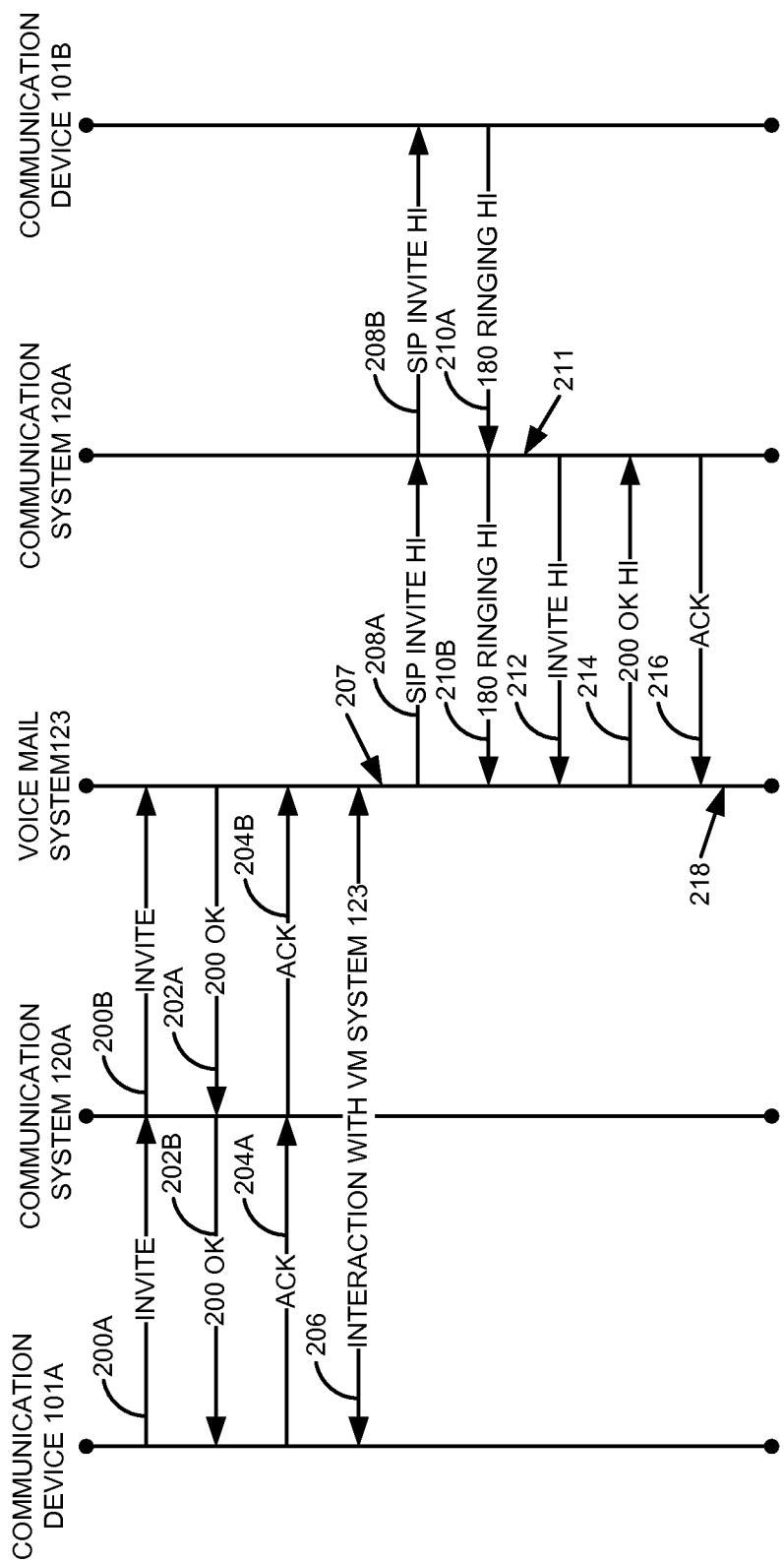
FIG. 2 is a flow diagram of a process for preserving language settings for forwarded communication sessions.
Figure 3:
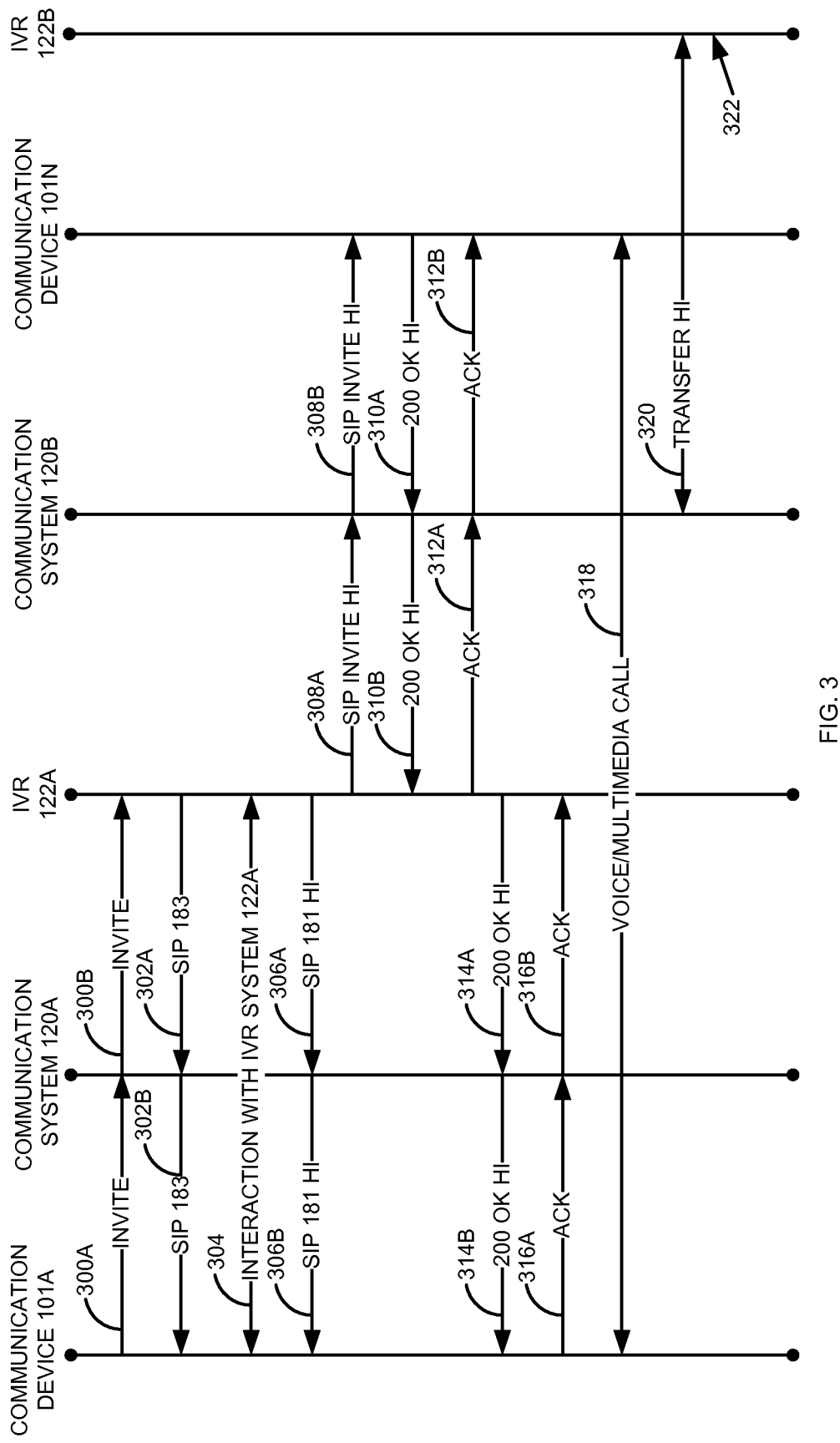
FIG. 3 is a flow diagram of a process for preserving language settings for transferred communication sessions.

FIG. 2 is a flow diagram of a process for preserving language settings for a forwarded communication session. Illustratively, the communication devices 101A-101N, the communication systems 120A-120B, the communication processors 121A-121B, the IVR systems 122A-122B, and the voicemail system 123 are stored-program-controlled entities, such as a computer or processor, which performs the method of FIGS. 2-3 and the processes described herein by executing program instructions stored in a non-transitory computer readable storage medium, such as a memory or disk. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts when the communication device 101A sends a SIP INVITE message, in step 200A, to establish a communication session with the voicemail system 123. The SIP INVITE is received by the communication system 120A and then sent to the voicemail system 123 in step 200B. The voicemail system 123 sends, in step 202A, a SIP 200 OK message to accept the SIP INVITE of step 200B. The SIP 200 OK message is forwarded by the communication system 120A to the communication device 101A. The communication device 101A sends the SIP ACK message in step 204A. The SIP ACK message of step 204A is forwarded by the communication system 120A to the voicemail system 123 in step 204B.

The voicemail system 123 (an interactive response system) sends a list of languages supported by the voicemail system 123 for the SIP communication session in step 206. For example, the voicemail system 123 may say "please select 1 if you want to use Spanish" (in Spanish), "select 2 if you want to use English" (in English), "select 3 if you want to use German" (in German). In response, the user selects one of the languages. The voicemail system 123 then uses the selection to present messages in the selected language (e.g., English) to the user.

The user can then review any voicemails. For example, if there was a voicemail from a user at the communication device 101B, the user may select, in step 207, an option presented by the voicemail system 123 to call the communication device 101B to talk to the user of the communication device 101B. As a result, a SIP INVITE with a History-Info header that that identifies the selected language (e.g., English in this example) is sent to the communication device 101B via the communication system 120A in steps 208A and 208B. The History-Info header is a defined header in the SIP protocol. The History-Info header may look as follows: History-Info: <sip:user@voicemail.example.com>; index=1; lang=English. The sip: user@voicemail.example.com is the address of the user's voicemail system 123 (an IVR system 122). The lang field identifies the particular language being used. In this example, text is used. However, in other embodiments, numbers or other characters may be used to identify the language. The History-Info header, in addition, may also include a dialect identifier. For example, the History-Info header may include the dialect (i.e., <sip: user@voicemail.example.com>; index=1; lang=Chinese; dialect=xxx).

The communication device 101B responds with a SIP 180 RINGING message with the History-Info header in step 210A. The communication system 120A forwards the SIP 180 RINGING message with the History-Info header to the voicemail system 123 in step 210B. If the user at the communication device 101B does not answer, the communication system 120A will stop alerting the communication device 101A in step 211. The communication system 120A forwards the communication session back to the voicemail system 123 by sending a SIP INVITE with the History-Info header in step 212. The voicemail system 123 answers the call and sends a SIP 200 OK with the History-Info header in step 214. The communication system 120A responds by sending the SIP ACK message in step 216

In response, because the user has been connected back to the voicemail system 123, the voicemail system 123 for-bears from sending the list of languages because of the History-Info header identifies the language as English in step 218. Instead, the voicemail system 123 plays the regular voicemail greeting in the selected language of step 206.

FIG. 3 is a flow diagram of a process for preserving language settings for transferred communication sessions. The process starts when the communication device 101A sends a SIP INVITE message, in step 300A, to establish a communication session with the IVR system 122A. The SIP INVITE is received by the communication system 120A and then sent to the IVR system 122A in step 300B. The IVR system 122A sends, in step 302A, a SIP 183 session-in-progress message. The SIP 183 session-in-progress message is forwarded by the communication system 120A to the communication device 101A in step 302B.

The communication session with the IVR system 122A is established and the IVR system 122A sends a list of languages (and optionally dialects) supported by the IVR system 122A for the SIP communication session in step 304. Based on a selection by the user of what language is preferred, the IVR system 122A presents a series of menu options to the user. For example, the user may be calling into a contact center. The user may be asked questions about what product the user is calling about in the selected language. The user may select an option to be transferred to an agent to discuss a problem with the product. As a result, a SIP INVITE with a History-Info header that that identifies the selected language (and optionally the dialect) is sent to the communication device 101N via the communication system 120B in steps 308A and 308B.

In this example, the contact center agent answers the call. The communication device 101N sends the SIP 200 OK with the History-Info header to the IVR system 122A via the communication system 120B in step 310A and 310B. The IVR system 122A sends a SIP ACK to the communication device 101N via the communication system 120B in steps 312A and 312B. The IVR system 122A sends a SIP 200 OK with the History-Info header to the communication device 101A via the communication system 120A in steps 314A and 314B. The communication device 101A sends the SIP ACK message to the IVR system 122A via the communication system 120A in steps 316A and 316B.

The user of the communication device 101A is connected to the contact center agent at the communication device 101N in step 318. The call can be a voice call, a video call, a multimedia call, or a text call. After the discussion with the contact center agent in step 318, the contact center agent transfers the voice call to the IVR 122B in step 320. The SIP messages involved in the call transfer of step 320 include the History-Info header. For example, if a SIP REFER message is used to transfer the voice call, the SIP REFER message will include the History-Info header with the selected language of step 304. The IVR system 122B uses the identified language in the History-Info header to forgo asking the user to select a language in step 322.

In the above, examples, the use of the History-Info header is described as being used by an IVR system 122/voicemail system 123. However, in other embodiments, other devices may also use the selected language information in the History-Info header. For example, the communication device 101N in FIG. 3 may use the selected language to display information that the caller wants to speak in German. The use of the History-Info header with the selected language can be used in scenarios where SIP messaging is involved. For instance, the History-Info header (defined in RFC 4244) may be used in SIP messaging to conference another party onto an existing call, for call forking, for SIP REGISTER messages, for SIP SUBSCRIBE messages, for SIP NOTIFY messages, for SIP PUBLISH messages, for SIP RINGING messages, for any kind of SIP message, and/or the like. For example, the History-Info header may be sent with a SIP SUBSCRIBE to be notified of an event that occurred where the information in the SIP NOTIFICATION message is presented in the selected language.

The selected language may be associated with a caller ID for the first SIP communication session. The selected language can be used in a second SIP communication session between the IVR system 122 and the user. For example, if the user again calls in the IVR system 122. The caller ID can be used to identifying the user and forgo sending of the first list of languages. If the second call gets transferred to a second IVR system 122, communication processor 121 can send a SIP message with the History-Info header to convey the previously selected language of the first communication session in the second communication session.

The above descriptions are depicted using voice calls and IVR systems 122. However, in other embodiments, the communication session may be an Instant Messaging (IM), text, or video communication session. For these types of communication sessions, an interactive response system, such as an IM interactive response system, a text interactive response system, and a video interactive response system may be used to select a language/dialect of the communication session. One of skill in the art would recognize that similar SIP messaging can be used to establish communication session for these types of communication sessions.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    sending, by a microprocessor, a first list of languages supported in a first Session Initiation Protocol (SIP) communication session with a communication device of a user;
    receiving, by the microprocessor, a selection of a language from the first list of languages in the first SIP communication session from the communication device of the user; and
    sending, by the microprocessor, the first SIP communication session with the communication device of the user to another communication device by sending a first SIP message, wherein the first SIP message comprises a SIP History-Info header that identifies the selected language for the first SIP communication session.

2. The method of claim 1, wherein the first list of languages is generated by a first Voice Interactive Voice Response System (IVR) and wherein sending the first SIP communication session with the communication device of the user to the another communication device comprises one of: forwarding, transferring, conferencing, or forking.

3. The method of claim 2, wherein the first SIP message is a first SIP
    INVITE message and further comprising:

receiving, by the microprocessor, a transfer of the first SIP communication session from the another communication device to the first IVR system, wherein the transferred first SIP communication session comprises a second SIP INVITE message that also includes the SIP History-Info header that identifies the selected language for the first SIP communication session; and
    in response to receiving the second SIP INVITE message with the SIP History-Info header that identifies the selected language for the first SIP communication session, foregoing sending, by the microprocessor, the first list of languages supported by the first IVR system to the communication device of the user.

4. The method of claim 2, wherein the first SIP message is a first SIP
    INVITE message and further comprising:
    receiving a transfer of the first SIP communication session from the another communication device to a second IVR system by receiving a second SIP INVITE message that also includes the SIP History-Info header that identifies the selected language for the first SIP communication session; and
    in response to receiving the second SIP INVITE message with the SIP History-Info header that identifies the selected language for the first SIP communication session, foregoing sending, by the second IVR system, a second list of languages supported by the second IVR system to the communication device of the user.

5. The method of claim 1, wherein the first list of languages is generated by a first Voice Interactive Voice Response System (IVR) and further comprising:
    identifying, by the microprocessor, the communication device of the user based on a caller ID for the first SIP communication session;
    establishing, by the microprocessor, a second SIP communication session between the first IVR system and the communication device of the user, wherein the communication device of the user is identified using the caller ID from the first SIP communication session; and
    in response to identifying the communication device of the user with the caller ID from the first SIP communication session, foregoing sending, by the microprocessor, of the first list of languages to the communication device of the user.

6. The method of claim 5, wherein the first SIP message is a first SIP INVITE message and further comprising:
    sending, by the microprocessor, the second SIP communication session with the communication device of the user to the another communication device by sending a second SIP INVITE message, wherein the second SIP INVITE message comprises the SIP History-Info header that identifies the selected language for the first SIP communication session.

7. The method of claim 1, wherein the first SIP communication session is one of a voice communication, a video communication, or a text communication.

8. The method of claim 1, wherein the format of the SIP History-Info header includes an address of an interactive response system.

9. The method of claim 1, wherein the first SIP communication session is a voice communication, wherein the first list of languages is generated by a first Interactive Voice Response (IVR) system and wherein sending the first SIP communication session is transferring the first SIP communication session to an agent in a contact center.

10. The method of claim 1, wherein the first list of languages is generated by one of: an Interactive Voice Response (IVR) system, a voicemail system, a contact center IVR, an auto attendant, or a company directory service.

11. A system comprising:
a microprocessor; and
a computer readable medium, coupled with the microprocessor and comprising microprocessor readable and executable instructions that cause the microprocessor to execute:
an interactive response system that sends a first list of languages supported in a first Session Initiation Protocol (SIP) communication session with a communication device of a user and receives a selection of a language from the first list of languages supported by the interactive response system in the first SIP communication session from the communication device of the user; and
a communication processor that sends the first SIP communication session with the communication device of the user to another communication device by sending a first SIP message, wherein the first SIP message comprises a SIP History-Info header that identifies the selected language for the first SIP communication session.

12. The system of claim 11, wherein the interactive response system is a first Voice Interactive Voice Response System (IVR) and wherein sending the first SIP communication session with the communication device of the user to the another communication device comprises one of: forwarding, transferring, conferencing, or forking.

13. The system of claim 12, wherein the first SIP message is a first SIP INVITE message and wherein:
the first IVR system receives a transfer of the first SIP communication session from the another communication device, wherein the transferred first SIP communication session comprises a second SIP INVITE message that also includes the SIP History-Info header that identifies the selected language for the first SIP communication session and the first IVR system foregoes sending the first list of languages supported by the first IVR system to the communication device of the user in response to receiving the second SIP INVITE message with the SIP History-Info header that identifies the selected language for the first SIP communication session.

14. The system of claim 12, wherein the first SIP message is a first SIP INVITE message and further comprising:
a second IVR system that receives a transfer of the first SIP communication session from the another communication device in a second SIP INVITE message that also includes the SIP History-Info header that identifies the selected language for the first SIP communication session and foregoes sending a second list of languages supported by the second IVR system to the communication device of the user in response to receiving the second SIP INVITE message with the SIP History-Info header that identifies the selected language for the first SIP communication session.

15. The system of claim 11, wherein the interactive response system is a first Voice Interactive Voice Response System (IVR) and wherein:
the communication processor identifies the communication device of the user based on a caller ID for the first SIP communication session, establishes a second SIP communication session between the first IVR system and the communication device of the user, wherein the communication device of the user is identified using the caller ID from the first SIP communication session, and foregoes sending of the first list of languages to the communication device of the user in response to identifying the communication device of the user with the caller ID from the first SIP communication session.

16. The system of claim 15, wherein the first SIP message is a first SIP INVITE message, wherein the communication processor sends the second SIP communication session with the communication device of the user to the another communication device by sending a second SIP INVITE message, and wherein the second SIP INVITE message comprises the SIP History-Info header that identifies the selected language for the first SIP communication session.

17. The system of claim 11, wherein the first SIP communication session is one of a voice communication, a video communication, or a text communication.

18. The system of claim 11, wherein the format of the SIP History-Info header includes an address of the interactive response system.

19. The system of claim 11, wherein the first SIP communication session is a voice communication, wherein the interactive response system is a first Interactive Voice Response (IVR) system and wherein sending the first SIP communication session is transferring the first SIP communication session to an agent in a contact center.

20. A system comprising:
a microprocessor; and
a computer readable medium, coupled with the microprocessor and comprising microprocessor readable and executable instructions that cause the microprocessor to execute:
an Interactive Voice Response (IVR) system that sends a first list of languages supported in a first Session Initiation Protocol (SIP) communication session with a communication device of a user and receives a selection of a language from the first list of languages in the first SIP communication session from the communication device of the user, receives a transfer of the first SIP communication session from another communication device, wherein the transferred first SIP communication session comprises a first SIP INVITE message that comprises a SIP History-Info header that identifies the selected language for the first SIP communication session, and foregoes sending the first list of languages to the communication device of the user in response to receiving the first SIP INVITE message with the SIP History-Info header that identifies the selected language for the first SIP communication session; and
a communication processor that sends the first SIP communication session with the communication device of the user to the another communication device by sending a second SIP INVITE message, wherein the second SIP INVITE message comprises the SIP History-Info header that identifies the selected language for the first SIP communication session, wherein sending the first SIP communication session with the communication device of the user to the another communication device comprises one of: forwarding, transferring, conferencing, or forking.

* * * * *